Oct. 10, 1967  H. E. SPOONER  3,346,350
ELECTRICAL CONTACT TAPE
Filed May 25, 1965

INVENTOR.
Howard E. Spooner
BY
John G. Kovaleck
AGENT

United States Patent Office 3,346,350
Patented Oct. 10, 1967

3,346,350
ELECTRICAL CONTACT TAPE
Howard E. Spooner, Lincoln, R.I., assignor to Engelhard Industries, Inc., Newark, N.J., a corporation of Delaware
Filed May 25, 1965, Ser. No. 458,654
6 Claims. (Cl. 29—183)

The invention deals with electrical contact tapes and more particularly with electrical contact tapes of the type adapted for bonding to metal bases by resistance welding.

Contact tapes are usually provided with a continuous linear resistance welding bead centrally of and longitudinally of a surface of the tape intended to be the undersurface of the tape in a welding operation. Such beads have the disadvantage that they are substantially massive and conduct welding heat away from a point of electrode welding contact thereby requiring sufficient welding current to overcome the conduction of heat away from the welding location, which may affect the surface finish of the contact tape.

They are also disadvantageous when employed in curved or rounded contact surface tapes because the tape tends to pivot on the bead to the extent that the edges of the tape contact the base to which the tape is welded, thereby containing gases between the welded edge and the welded bead, which is detrimental to uniform weld bonding, desirable electrical characteristics, etc.

It is an object of the present invention to provide an electrical contact tape with resistance welding projections of a nature such that the entrapment of gases are precluded.

It is another object of the invention to provide an electrical contact tape with resistance welding projections of a nature such that the weld-bonded area is considerably greater than when a single welding bead is employed.

It is a further object of the invention to provide an electrical contact tape with resistance welding projections of a nature such that the tape does not require welding currents and pressures of a magnitude which may be detrimental to the contact metal of the tape.

Figure 2:
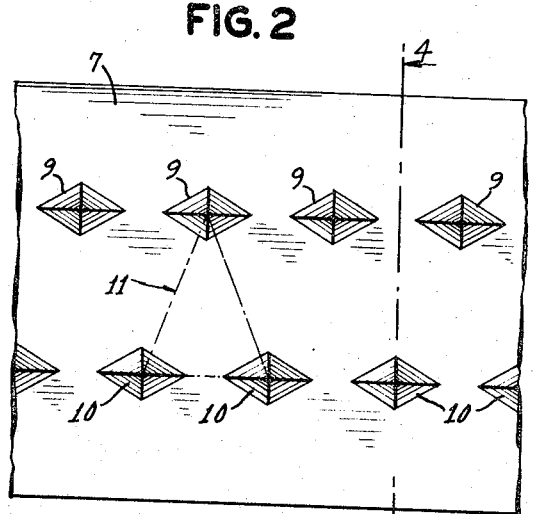
Figure 1:
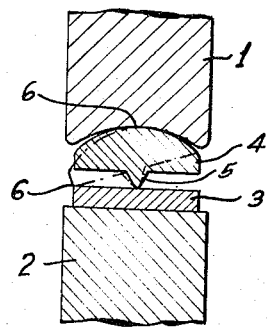
Figure 3:
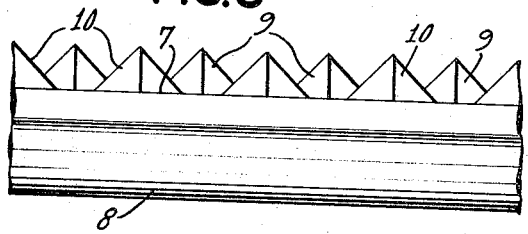
Figure 6:
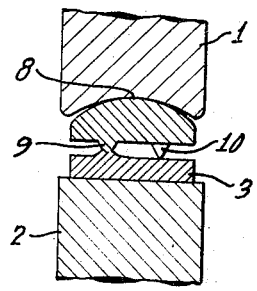
Figure 4:
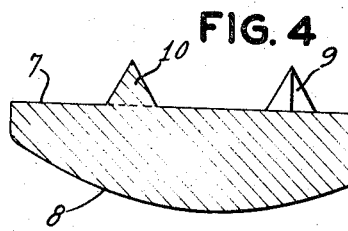
Figure 5:
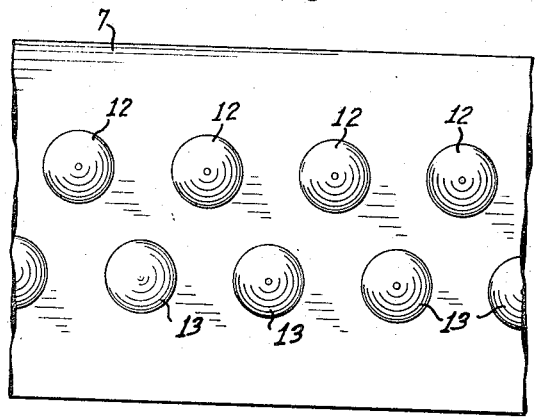
Figure 7:

Other objects and advantages of the invention will become apparent from the description hereinafter following and the drawings forming a part hereof, in which:

FIGURE 1 illustrates a cross-sectional view of conventional welding electrodes with a base metal and a conventional electrical contact tape positioned therebetween, FIGURE 2 illustrates a bottom view of an electrical contact tape according to the invention, FIGURE 3 illustrates a side view of FIGURE 2, FIGURE 4 illustrates a cross-sectional view along lines 4—4 of FIGURE 2, FIGURE 5 illustrates a bottom view of a modified form of electrical contact tape according to the invention, FIGURE 6 illustrates a cross-sectional view of a contact tape according to the invention mounted for welding to a base and positioned between a pair of conventional welding electrodes, and FIGURE 7 illustrates a cross-sectional view of a bimetallic tape according to the invention.

The invention deals with an electrical contact tape having a plurality of laterally-spaced rows of spaced contact projections so related to each other that the projections of one row are welded to a base in rapid sequence with the projections of another row, thereby immediately and substantially continuously distributing welded areas widthwise as well as lengthwise of the tape while permitting egress of hot gases between the tape and the base to which the tape is welded.

Referring to the drawings, FIGURE 1 illustrates a cross-sectional view of conventional welding electrodes with a base metal and a conventional electrical contact tape positioned therebetween. The electrodes of FIGURE 1 are in the form of an upper electrode shown in fragmentary cross section and a lower electrode 2 shown in fragmentary cross section. Preferably, the electrodes are in the form of wheel electrodes. A metal base 3 is positioned in contact with the lower electrode, and a conventional contact tape 4 having a rounded contact surface is positioned in abutment with an appropriately grooved electrode mating surface while a central continuous welding bead 5 contacts the base metal. This type of resistance welding bead has the disadvantage that the welding tape is subject to pivoting on the bead, whereby the edge 6 of the bead (shown in broken lines) contacts the metal base and divides the welding current linearly along the edge and the bead forming an enclosure therebetween which prevents desirable egress of hot gases.

In accordance with the invention and with reference to FIGURES 2, 3 and 4, the tape comprises a flat welding or plain surface 7 and preferably, but not necessarily, a rounded surface contact 8. The welding surface is provided with a plurality of generally parallel laterally-spaced rows of welding projections 9 and 10 longitudinally of the tape. The contacts of each row are also spaced from each other longitudinally of the tape with the spacings between the projections in their respective rows being less than the width of the projections at their bases in the plane of the welding surface 7 from which they project. In addition, the projections in one row are staggered relative to the projections in another row so that an adjacent pair of projections in one row and one projection in another row from three points of a hypothetical triangle 11.

While FIGURES 2, 3 and 4 illustrate welding projections of pyramidical shape having polygonal bases in the plane of the welding surface 7, other shaped projections are contemplated such, for example, as that shown in FIGURE 5 illustrating conical projections 12 and 13. Apart from the modified shape of welding projections illustrated by FIGURE 5, the tape is otherwise identical to that illustrated by FIGURES 2, 3 and 4 which show a tape substantially of a plano-convex cross section with the projections extending from the planar surface 7.

In the welding operation, the electrical contact tape and metal base strip 3 are fed between the electrodes 1 and 2 from coils positioned, respectively, above and below the welding location between the electrodes so that the welding projections of each row of projections may each sequentially and alternately be subjected to the welding currents before complete fusion with the metal base strip 3 and are so spaced that one weld projection is always in contact with the part being welded to.

FIGURE 6 illustrate an exaggerated cross-sectional view of the tape according to the invention as it passes contiguously with strip 3 between welding electrodes 1 and 2. The projection 9 is shown to be in an at least partly fused state as the projection 10 contacts strip 3. The operation is a continuous rapid operation and such that fusion of the projections is staggered widthwise of the tape substantially instantaneously and sequentially alternately from row to row longitudinally of the tape.

FIGURE 7 illustrates a cross-sectional view of the bimetallic tape in effectively welded condition after having passed through the welding electrodes of FIGURE 6.

Various modifications are contemplated within the scope of the appended claims.

What is claimed is:

1. An electrical contact tape comprising a tape body having a surface adapted for welding to a metal base, a plurality of laterally-spaced rows of welding projections on the said surface and directed longitudinally of the tape body, each row comprising a plurality of welding projections spaced from each other longitudinally of the tape body, the projections in one row being staggered relative to projections in an adjacent row so that two projections in one row and one projection in an adjacent row form three points of a hypothetical triangle.

2. Electrical contact tape comprising a tape body having a surface adapted for welding to a metal base, a plurality of laterally-spaced rows of welding projections on the said surface and directed longitudinally of the tape body, each row comprising a plurality of welding projections spaced from each other longitudinally of the tape body, the spacing between projections of each row being less than the width of the projections in the plane of the said surface, the projections in one row being staggered relative to projections in an adjacent row so that two projections in one row and one projection in an adjacent row form three points of a hypothetical triangle.

3. An electrical contact tape according to claim 2, wherein the tape has a substantially plano-convex cross section.

4. An electrical contact tape according to claim 2, wherein the projections are of pyramidical shape.

5. An electrical contact tape according to claim 2, wherein the projections are of conical shape.

6. The method of welding an electrical contact tape having a plurality of spaced welding projections on a surface thereof to a metal base, comprising sequentially welding the projections to the base laterally and longitudinally thereof.

References Cited
UNITED STATES PATENTS

| | | | |
|---|---|---|---|
| 1,856,898 | 5/1932 | Wood | 29—180 |
| 2,087,530 | 7/1937 | Potchen | 29—180 |
| 2,878,553 | 3/1959 | Hirsch | 29—180 |
| 3,275,425 | 9/1966 | Thomson et al. | 29—183.5 |

DAVID L. RECK, *Primary Examiner.*

RICHARD O. DEAN, *Examiner.*